United States Patent [19]

Nakano et al.

[11] Patent Number: 4,769,885
[45] Date of Patent: Sep. 13, 1988

[54] ECCENTRIC TOOL REST

[75] Inventors: Hideki Nakano, Komaki; Kiyokazu Kainuma, Konan; Kazukane Kunii, Gifu; Norihiko Shimizu, Nagoya, all of Japan

[73] Assignee: Yamazaki Mazak Corporation, Niwa, Japan

[21] Appl. No.: 943,185

[22] Filed: Dec. 18, 1986

[30] Foreign Application Priority Data

Dec. 19, 1985 [JP] Japan .................. 60-286608
Dec. 19, 1985 [JP] Japan .................. 60-286609
May 6, 1986 [JP] Japan .................. 61-103395
May 19, 1986 [JP] Japan .................. 61-114378

[51] Int. Cl.⁴ .................. B23Q 17/00; B23C 1/12
[52] U.S. Cl. .................. 29/40; 409/191; 409/200
[58] Field of Search .................. 29/27 C, 33 J, 35 S, 29/40, 27 R; 409/201, 200, 216, 211, 191, 237, 143; 408/35, 150

[56] References Cited

U.S. PATENT DOCUMENTS 3,584,534  6/1970  Hougen .................. 409/191
3,690,220  9/1972  Escobedo .................. 409/211
4,104,943  8/1978  Calderoni .................. 409/191
4,370,080  1/1983  Goode .................. 409/216 X
4,378,621  4/1983  Babel .................. 29/26 A
4,559,682  12/1985  Sachot .................. 409/216 X

FOREIGN PATENT DOCUMENTS 673387  7/1979  U.S.S.R. .................. 409/201

Primary Examiner—William R. Briggs
Attorney, Agent, or Firm—Cushman, Darby & Cushman

[57] ABSTRACT

A casing is rotatably and stoppably held on tool supporting means, a rotary tool spindle is rotatably supported on the casing so as to have a shifted rotary center with respect to the rotary center of the casing, power transmission means is rotatably supported on the casing, and the power transmission means and the rotary tool spindle are engaged through eccentric engagement means. The movement of the rotary tool in the Y-axis direction is performed by integrally rotating the casing and the rotary tool spindle. The machining is performed by rotating the power transmission means in the state where the casing is held stationary, thereby to rotate the rotary tool with respect to the stationary casing through the eccentric engagement means.

9 Claims, 5 Drawing Sheets

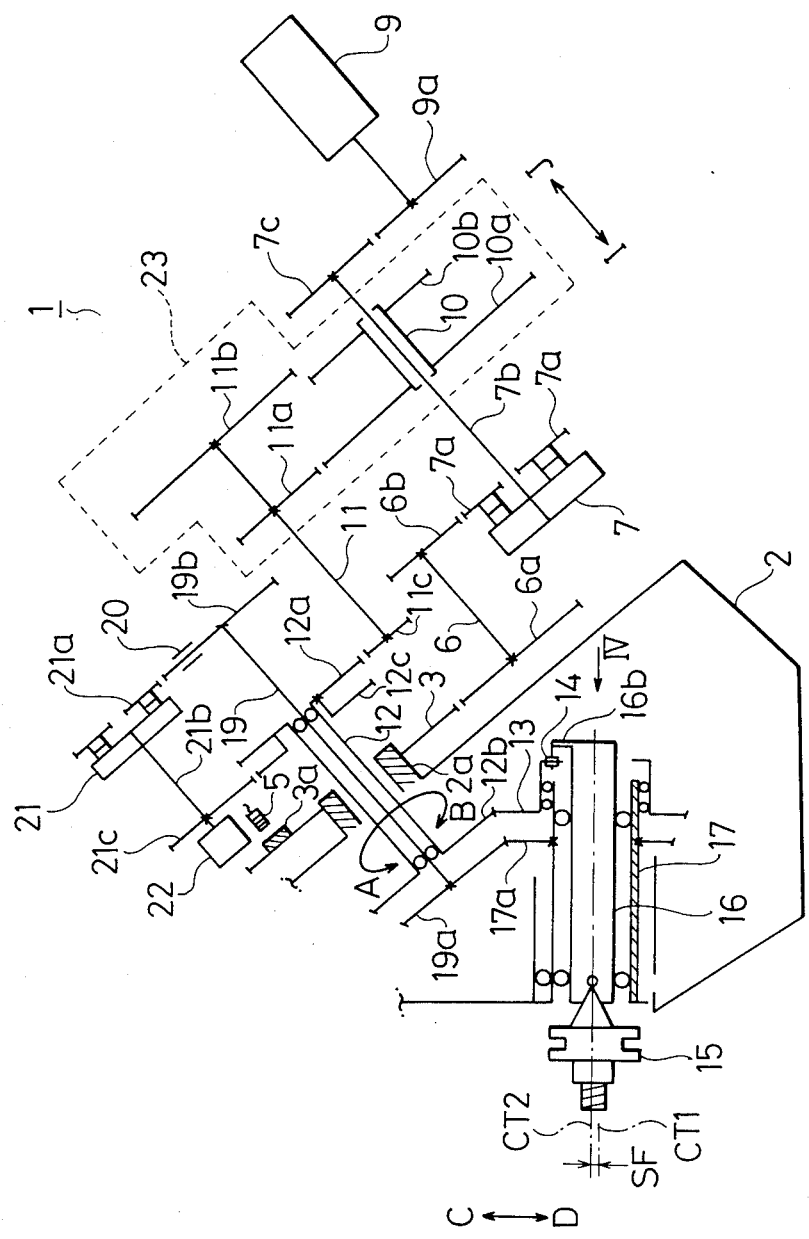

ECCENTRIC TOOL REST

BACKGROUND OF THE INVENTION

This invention relates to an eccentric tool rest capable of moving a rotary tool in an axial direction in a lathe or the like which has the milling function.

In a lathe having the milling function, it is frequently required that machining, such as key groove machining, is performed by a rotary tool.

Heretofore, in response to such requirement, there was proposed a structure wherein a rotary tool is rotatably disposed within a casing, the tool being eccentric with respect to the center of the casing, the rotary power being transmitted to the rotary tool from the center of the casing through a gear train.

However, in such structure as mentioned above, it was required to dispose within the casing a spindle of the rotary tool, and a gear train and a driving shaft for transmitting driving power to it. Therefore, the diameter of a spindle of the rotary tool is obliged to be very small with respect to the diameter of the casing since the spindle is interposed between the driving shaft placed at the rotary center of the casing and the inner wall of the casing. In order to make the diameter of the tool spindle large for performing a heavy cutting by means of a large torque, the diameter of the casing is required to be made large. Such a large casing is inconvenient as a structure which is placed on a turret. In addition, the large casing restricts the arrangement of other tools, and therefore disturbs any attempt to improve the performance of such a turret.

The present invention seeks to overcome the above-mentioned shortcomings. It is therefore a general object of the present invention to provide an eccentric tool rest in which the diameter of a spindle of a rotary tool can be made relatively large within a casing with respect to the diameter of the casing.

SUMMARY OF THE INVENTION

In order to achieve the above object, the first invention comprises tool supporting means, a casing rotatably and stoppably held on the tool supporting means, a rotary tool spindle rotatably supported on the casing so as to have an eccentric rotary center with respect to a rotary center of the casing, power transmission means rotatably supported on the casing, and eccentric engagement means for engaging the power transmission means with the rotary tool spindle.

According to one embodiment of the present invention, the power transmission means is a first gear, and the eccentric engagement means comprises an inner gear formed on the first gear and a second gear provided on the rotary tool spindle which meshes with the inner gear.

According to another embodiment of the present invention, the power transmission means is a gear and the eccentric engagement means comprises a slide-engagement means interposed between the gear and the rotary tool spindle.

The second invention comprises tool supporting means, a casing rotatably and stoppably held on the tool supporting means, a rotary tool spindle rotatably supported on the casing so as to have an eccentric rotary center with respect to a rotary center of the casing, power transmission means rotatably supported on an outer peripheral portion of the casing for rotation with respect to the casing, eccentric engagement means for engaging the power transmission means with the rotary tool spindle, and clutch means interposed between the casing and the power transmission means and adapted to cut the transmission of torque from the power transmission means to the casing.

The third invention of the present invention comprises tool supporting means formed with a hole having a first tapered portion, a casing rotatably and stoppably held in the hole, the casing being formed at its outer periphery with a second tapered portion to engage with the first tapered portion, casing drive means adapted to move the casing in the axial direction within the hole and holding the casing stationary with respect to the tool supporting means by the first and second tapered portions into abut-engagement with each other, a rotary tool spindle rotatably mounted to the casing so as to have an eccentric rotary center with respect to the rotary center of the casing, power transmission means rotatably supported on an outer peripheral portion of the casing for rotation with respect to the casing, eccentric engagement means for engaging the power transmission means and the rotary tool spindle, and rotation driving means mounted to the casing and adapted to rotate the casing.

According to the present invention, the movement of the rotary tool in the direction of Y-axis can be performed by integrally rotating the casing and the rotary tool spindle, and the machining can be performed by rotating the power transmission means while the casing is being held stationary. Furthermore, since the transmission of torque to the rotary tool spindle is performed through the power transmission means rotatably supported on the casing and the eccentric engagement means, a provision within the casing of a gear train and the like for driving the rotary tool spindle is unnecessary. Therefore, the diameter of the rotary tool spindle can be made relatively large with respect to the diameter of the casing. Thus, a heavy cutting requiring a large torque can be performed by the rotary tool spindle using the compact casing. Moreover, since the casing can be made compact, the arrangements of other tools on a turret are not unnecessarily limited, thereby to provide an excellent functional turret.

According to the second invention, the movement of the rotary tool in the direction of Y-axis is performed by connecting the power transmission means and the casing by means of the clutch means and rotating the casing by means of the power transmission means, and the machining is performed by disconnecting the casing from the power transmission means through the clutch means and rotating the rotary tool spindle by the power transmission means through the eccentric engagement means while the casing is being held stationary.

Furthermore, since the rotation of the casing and the rotation of the rotary tool spindle can be performed by using the power transmission means such as one piece of bevel gear, etc only one system is sufficient as a power transmission system until the power transmission means. Thus, the power transmission system within the eccentric tool rest can be simplified and made light in weight.

Furthermore, according to the third invention, the movement of the rotary tool in the direction of Y-axis is performed by driving the casing drive means so as to move the casing, disengaging the first tapered portion from the second tapered portion and, in the foregoing state, rotating the casing together with the rotary tool spindle using the rotation drive means, whereas the machining is performed by engaging the first tapered portion with the second tapered portion using the casing drive means so as to hold the casing stationary and, in the foregoing state, rotating the rotary tool spindle by the power transmission means through the eccentric engagement means.

BRIEF DESCRIPTION OF THE DRAWINGS

FIG. 3 is a schematic view of an eccentric tool rest according to another embodiment of the present invention;

DESCRIPTION OF THE PREFERRED EMBODIMENTS

Figure 1:
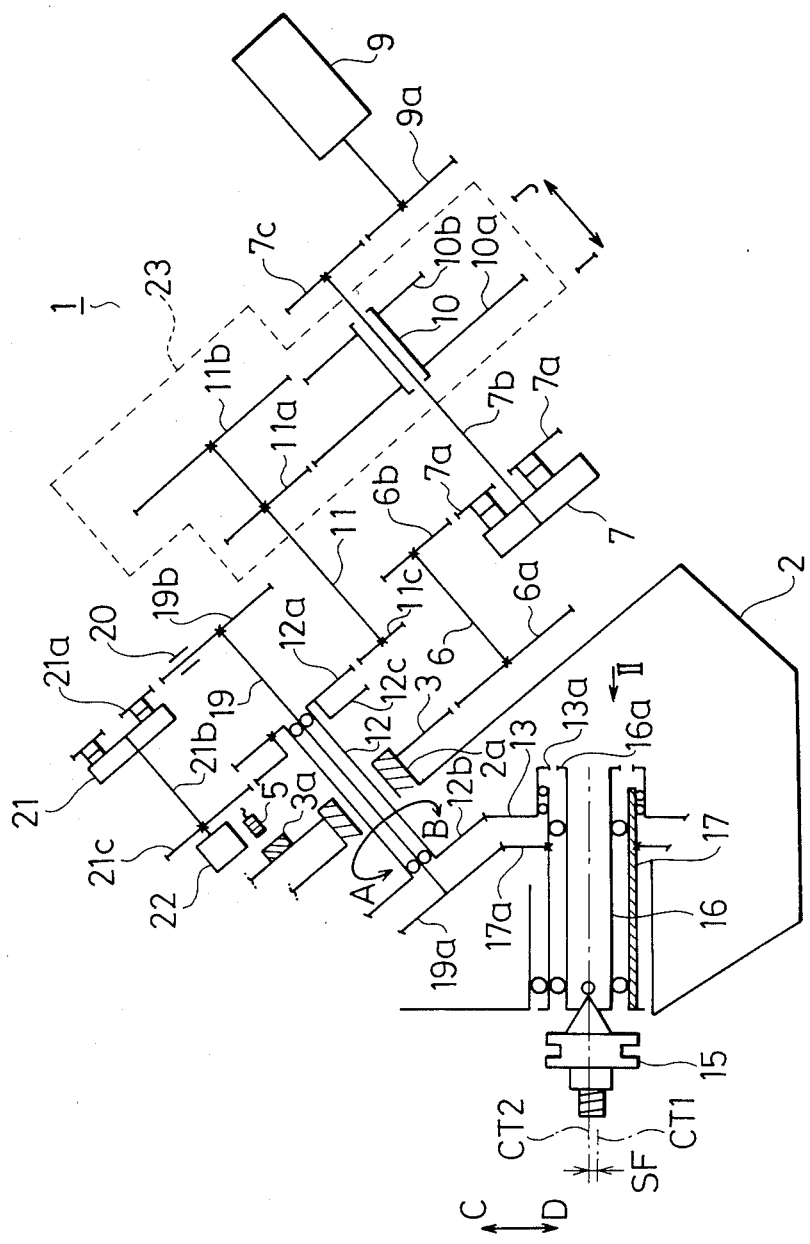
FIG. 1 is a schematic view showing an eccentric tool rest according to one embodiment of the present invention.

An eccentric tool rest 1, as shown in FIG. 1, has a turret 2, which is rotatably supported thereon for rotation about a shaft 2a in the directions as shown by arrows A and B. The shaft 2a is provided with an index gear 3 fixedly attached thereto. At an appropriate location of the side of the index gear 3, a plurality of turret stop position index dogs 3a (only one is shown in FIG. 1) are arranged on the same circumference. A proximity sensor 5 is provided in a location opposite to the dog 3a. The index gear 3 is meshed with a gear 6a secured to one end of the a shaft 6. Secured to the other end of the shaft 6 is a gear 6b with which is meshed a gear 7a constituting an electromagnetic clutch 7. The electromagnetic clutch 7a is provided with a shaft 7b. By driving and stopping the electromagnetic clutch 7, the torque of the shaft 7b can be selectively transmitted to the gear 7a side.

Figure 2:
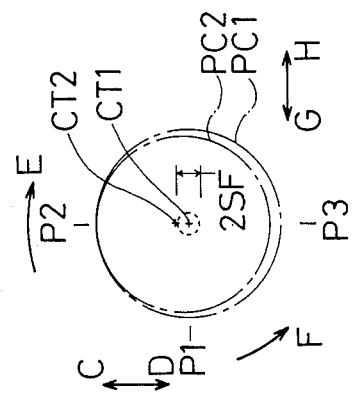
FIG. 2 is a schematic view of the portion as shown by an arrow II of FIG. 1, in which a gear on a rotary tool spindle is meshed with an inner gear for driving the spindle.

A gear 7c is provided to the front end of the shaft 7b. The gear 7c is meshed with a gear 9a mounted on an output shaft of a drive motor 9. Furthermore, the shaft 7b is slidably engaged with a sliding shaft 10 constituting a change gear mechanism 23 for sliding only in the directions as shown by arrows I, J. The sliding shaft 10 is provided with gears 10a, 10b having different numbers of teeth fixedly attached thereto. At locations opposite to the gears 10a, 10b, gears 11a, 11b having different numbers of teeth fixedly attached to a shaft 11 are provided so that the gears 11a, 11b can be selectively meshed with the gears 10a, 10b. Furthermore, at the other end of the shaft 11, a gear 11c is provided. The gear 11c is meshed with a gear 12a formed on a hollow shaft 12 which is rotatably supported on the shaft 2a. At an end portion of the shaft 12 within the turret 2, a bevel gear 12b is provided. The bevel gear 12b is meshed with a bevel gear 13. The bevel gear 13 is formed with an inner gear 13a with which is meshed a gear 16a formed at the right end in FIG. 1 of a rotary tool spindle 16 detachably attached thereon with a rotary tool 15. The gears 13a and 16a, as shown in FIG. 2, are formed as such that the gear 16a has a smaller pitch circle PC2 than a pitch circle PC1 which the gear 13a has. That is, the numbers of teeth of the gear 13a are larger than those of the gear 16a.

The rotary tool spindle 16 is rotatably supported on a casing 17 which is rotatably supported with respect to the turret 2. As for the supporting mode thereof, the rotary tool spindle 16 is supported as such that the rotary center CT2 of the rotary tool spindle 16 is eccentrically shifted by a shift amount SF with respect to the rotary center CT1 of the casing 17. The bevel gear 13 is rotatably supported on the casing 17 which is provided with a bevel gear 17a secured thereto. The bevel gear 17a is meshed with a bevel gear 19a secured to one end of a shaft 19 which is rotatably supported within the shaft 12.

The other end of the shaft 19 is provided with a gear 19b. The gear 19b is provided with a disk brake 20 adapted to restrict the rotation of the gear 19b. The gear 19b is meshed with a gear 21a of an electromagnetic clutch 21 which is provided with a shaft 21b. By driving and stopping the electromagnetic clutch 21, the torque of the shaft 21b can be selectively transmitted to the gear 21a side. The front end of the shaft 21b is provided with a position coder 22c and a gear 21c. The gear 21c is meshed with the gear 12c formed on the gear 12a.

With the above-mentioned construction of the eccentric tool rest 1, when a normal cutting, i.e., a cutting not accompanied with a movement in the direction (direction of Y-axis) as shown by arrows C, D of FIG. 1, using the rotary tool 15 is performed, the disk brake 20 is driven to restrict the rotation of the shaft 19 through the gear 19b. Then, the rotation of the casing 17 with respect to the turret 2 is also restricted through the gears 19a, 17a. As a result, the casing 17 is fixedly secured to the turret 2. Due to the foregoing, the rotary tool spindle 16 within the casing 17 is held in a normal machining position (for example, a position where the gears 13a and 16a are meshed at point P1 of FIG. 2, i.e., at the point P1, the rotary center CT1 of the casing 17 and the rotary center CT2 of the rotary tool spindle 16 are brought to be in alignment relation in Y-axis direction).

In the above-mentioned state, when the drive motor 9 is rotated, the rotary tool spindle 16, which is held stationary in the casing 17, is rotated within the casing 17 through gears 9a, 7c, change speed mechanism 23, shaft 11, gears 11c, 12a, shaft 12, bevel gears 12b, 13, inner gear 13a, and gear 16a. The rotary tool 15 mounted on the rotary tool spindle 16 is also rotated to perform a predetermined machining. At this time, since the electromagnetic clutch 7 is held in an "not-driven" state, the shaft 7b and the gear 8a are disconnected. Therefore, the rotation of the shaft 7b driven by the drive motor 9 does not cause the shaft 6 to be rotated to rotate the turret 2. Thus, a machining can be smoothly performed by the rotary tool 15.

Next, when the rotary tool 15 is to be moved from the normal machining position toward the vertical direction of FIG. 1, i.e., Y-axis direction shown by the arrows C, D, the electromagnetic clutch 21 is actuated to connect the shaft 21b with the gear 21a, and the disk brake 20 is stopped actuating to permit the gear 19b, accordingly, the shaft 19 to be rotated. Then, when the drive motor 9 is rotated at a low speed, the torque of the drive motor 9 is transmitted to the gear 12a through the change speed mechanism 23 and rotate the rotary tool spindle 16 in the predetermined direction as already described. When the gear 12a is rotated, the casing 17 is also rotated through gears 12c, 21c, electromagnetic clutch 21, gears 21a, 19b, shaft 19, and bevel gears 19a, 17a. Then, the rotary tool spindle 16 and the casing 17 are integrally rotated with respect to the turret 2. Since the rotary center CT2 of the rotary tool spindle 16 is shifted by SF with respect to the rotary center CT1 of the casing 17, the integral rotation of the casing 17 and the rotary tool spindle 16 causes the rotary center CT2 of the rotary tool and spindle 16 to move in such a manner as to draw a circle having a diameter 2SF about the rotary center CT1 as shown by the dotted line of FIG. 2.

More specifically, when the casing 17 and the rotary tool spindle 16 are rotated by 90° in the direction as shown by an arrow E of FIG. 2 with respect to the normal machining position which corresponds to the position P1 of FIG. 2 and the meshing position of the gears 13a and 16a is moved from normal machining position P1 to a position P2, the rotary center CT2 is moved by a distance SF in the direction as shown by the arrow C. When the casing 17 and the rotary tool spindle 16 are rotated by 90° in the direction as shown by an arrow F of FIG. 2 with respect to the normal machining position and the meshing position of the gears 13a, 16a is moved from the normal machining position P1 to a position P3, the rotary center CT2 is moved by a distance SF in the direction as shown by an arrow D. Accordingly, by rotating the casing 17 and the rotary tool spindle 16 within the range of ±90° in the direction either shown by the arrow E or F, the rotary center CT2 is moved within the range of the distance ±SF in the direction as shown by the arrows C, D. Due to the foregoing, the rotary tool 15 can be also moved within the range of the distance ±SF in the direction of Y-axis. The moving amount of the rotary tool spindle 16 in the Y-axis direction can be detected by the position coder 22 through detection of the rotary angle of the shaft 21b. Therefore, by properly controlling the amount of the rotary angle of the drive motor 9 while watching the output of the position coder 22, the rotary tool spindle 16 can be moved to any desired place.

In this way, when the rotary tool 15 has been moved by a predetermined distance in the Y-axis direction, the electromagnetic clutch 21 is stopped actuating to disconnect the shaft 21b from the shaft 19 and, at the same time, the disk brake 20 is actuated to restrict the rotation of the shaft 19. Due to the foregoing, since the casing 17 is restricted its rotation with respect to the turret 2, the rotary tool spindle 16, which has been moved by the predetermined distance in the Y-axis direction, is held within the casing 17 in that state. At this time, when the drive motor 9 is rotated, the rotary tool spindle 16 is rotated together with the rotary tool 15 through the change speed mechanism 23 and the shafts 11, 12 in the same manner as a normal machining, thereby to perform a predetermined machining.

When the rotary tool spindle 16 is moved in the Y-axis direction, the center of the rotary tool 15 is also moved in the X axis direction which is shown by the arrows G, H of FIG. 2, However, since the moving amount of the rotary tool 15 corresponds to the Y-axis shifted amount, it can be appropriately corrected by an NC apparatus.

When the turret 2 is to be rotated in order to change a tool, the electromagnetic clutch 7 is actuated to connect the shaft 7b with the gear 7a and, at the same time, the change gear mechanism 23 is brought to its neutral state to disconnect the shaft 7b from the shaft 11. In this state, when the drive motor 9 is rotated, the torque of the drive motor 9 is transmitted to the turret 2 through shaft 7b, gears 7a, 6b, shaft 6 and gears 6a, 3, thereby to rotate the turret 2 about the shaft 2a. The index of the turret 2 is performed by the conventional method using the dog 3a on the gear 3 and the proximity sensor 5.

Figure 4:
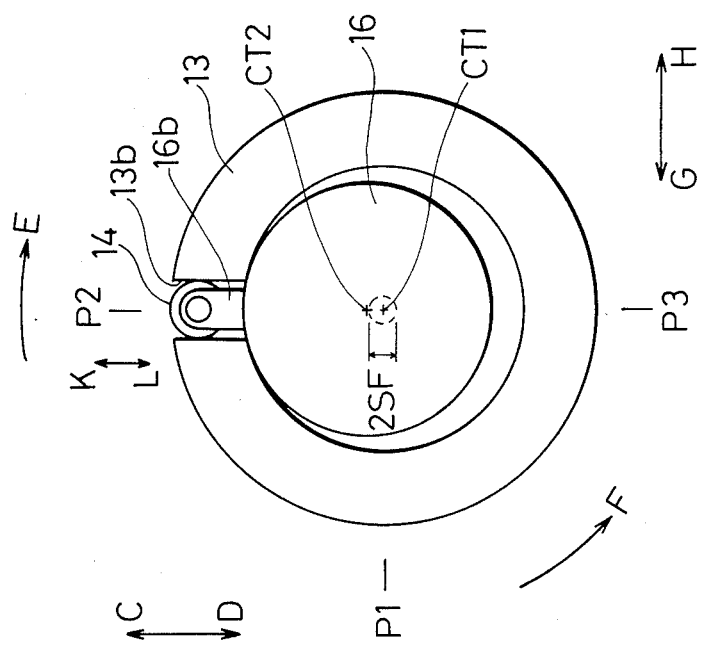
FIG. 4 is a schematic view of the portion shown by an arrow IV of FIG. 3, in which the rotary tool spindle is engaged with the gear for driving the spindle.

In the above-described embodiment, the inner gear 13a and the gear 16a are used as the eccentric connection means. However, many other devices can be thought as the eccentric connecting means. Referring to FIGS. 3 and 4, there will be described modified embodiments in which slide engagement means comprising a groove, a guide roller, etc. is used as the eccentric engagement means. Identical parts to those already described with respect to FIG. 1 are given identical numerals and description thereof is omitted.

The right-hand side portion (FIG. 3) of a bevel gear 13 is formed a groove 13b, as is shown in FIG. 4, toward the rotary center CT1 of the bevel gear 13 and a casing 17 as will be described hereinafter. Engaged in the groove 13b is a guide roller 14 for rolling movement therein. The guide roller 14 is provided to the right-hand edge (FIG. 3) of a rotary tool spindle 16 with a rotary tool 15 detachably attached thereto through an arm 16b. The rotary tool spindle 16 is rotatably supported on the casing 17 which is rotatably supported with respect to a turret 2. The supporting mode of the rotary tool spindle 16 is such that the rotary center CT2 of the rotary tool spindle 16 is shifted by an amount SF with respect to the rotary center CT1 of the casing 17.

With the above-described constitution of the eccentric tool rest 1 according to this embodiment, when a normal cutting, i.e., a cutting not accompanied with a movement in the Y-axis direction as shown by the arrows C, D of FIG. 3, using the rotary tool 15 is performed, the disk brake 20 is actuated to restrict the rotation of the shaft 19 through the gear 19b. Then, the rotation of the casing 17 with respect to the turret 2 is also restricted through the bevel gears 19a and 17a. As a result, the casing 17 is fixed with respect to the turret 2. Due to the foregoing, the rotary tool spindle 16 within the casing 17 is held in the normal machining position (for example, the position where the groove 13b and the guide roller 14 are engaged at point P1, i.e., at the point P1, the rotary center CT1 of the casing 17 and the rotary center CT2 of the rotary tool spindle 16 are brought to be in alignment in the Y-axis direction).

In the above-mentioned state, when the drive motor 9 is rotated, the bevel gear 13 is rotated through gears 9a, 7c, change speed mechanism 23, shaft 11, gears 11c, 12a, shaft 12 and bevel gear 12b. Then, the groove 13b of the bevel gear 13 is also rotated, and the rotary tool spindle 16 is also rotated through the guide roller 14 which is engaged in the groove 13b and the arm 16b. Since the rotary center CT2 of the rotary tool spindle 16 and the rotary center CT1 of the casing 17 are shifted by the distance SF as already described, the rotary tool spindle 16 held in its shifted state is rotated while causing the guide roller 14 to roll within the groove 13b of the gear 13 which is rotated about the rotary center CT1 in the direction as shown by the arrows K, L of FIG. 4.

In this way, the rotary tool spindle 16 is rotated within the casing 17 which is held stationary. Therefore, the rotary tool 15 mounted on the rotary tool spindle 16 is also rotated to perform a predetermined machining.

Next, when the rotary tool spindle 16 is to be shifted, as already described, the electromagnetic clutch 21 is actuated to connect the shaft 21b with the gear 21a and stop the actuation of the disk brake 20. In the foregoing state, the rotary tool spindle 16 and the casing 17 are integrally rotated at a low speed by the drive motor 9, thereby to cause the rotary tool spindle 16 to be shifted.

More specifically, when the casing 17 and the rotary tool spindle 16 is rotated by 90° in the direction as shown by the arrow E of FIG. 4 with respect to the normal machining position which corresponds to the position P1 of FIG. 4 and the engaging position of the groove 13b and the guide roller 14 is moved from the normal machining position P1 to the position P2, the rotary center CT2 is moved by a distance SF in the direction as shown by the arrow C. Furthermore, when the casing 17 and the rotary tool spindle 16 is rotated by 90° in the direction as shown by the arrow F of FIG. 2 and the engaging position of the groove 13b and the guide roller 14 is moved from the normal machining position P1 to the position P3, the rotary center CT2 is moved by the distance SF in the direction as shown by the arrow D. Therefore, by rotating the casing 17 and the rotary tool spindle 16 within the range of ±90° in the direction as shown by the arrow E or in the direction as shown by the arrow F, the rotary center CT2 can be moved within the range of the distance ±SF in the direction as shown by the arrows C, D. Due to the foregoing, the rotary tool 15 can be also moved within the range of the distance ±SF in the direction of Y-axis. Of course, the rotary tool 15 can be correctly positioned by rotating the casing 17 and the rotary tool spindle 16 within the range of 360°.

In the above-described embodiment, the gear 13 and the rotary tool spindle 16 are engaged through the groove 13b and the guide roller 14. Alternatively, the engagement between the gear 13 and the rotary tool spindle 16 can be performed by means of a slider and other slide engagement means (the term "slide engagement means" used herein include both roll contact and slide contact in addition to a slide contact) which can transmit the torque in such a manner that permitting the eccentric of the rotary tool spindle 16.

Next, another embodiment of the present invention will be described.

Figure 5:
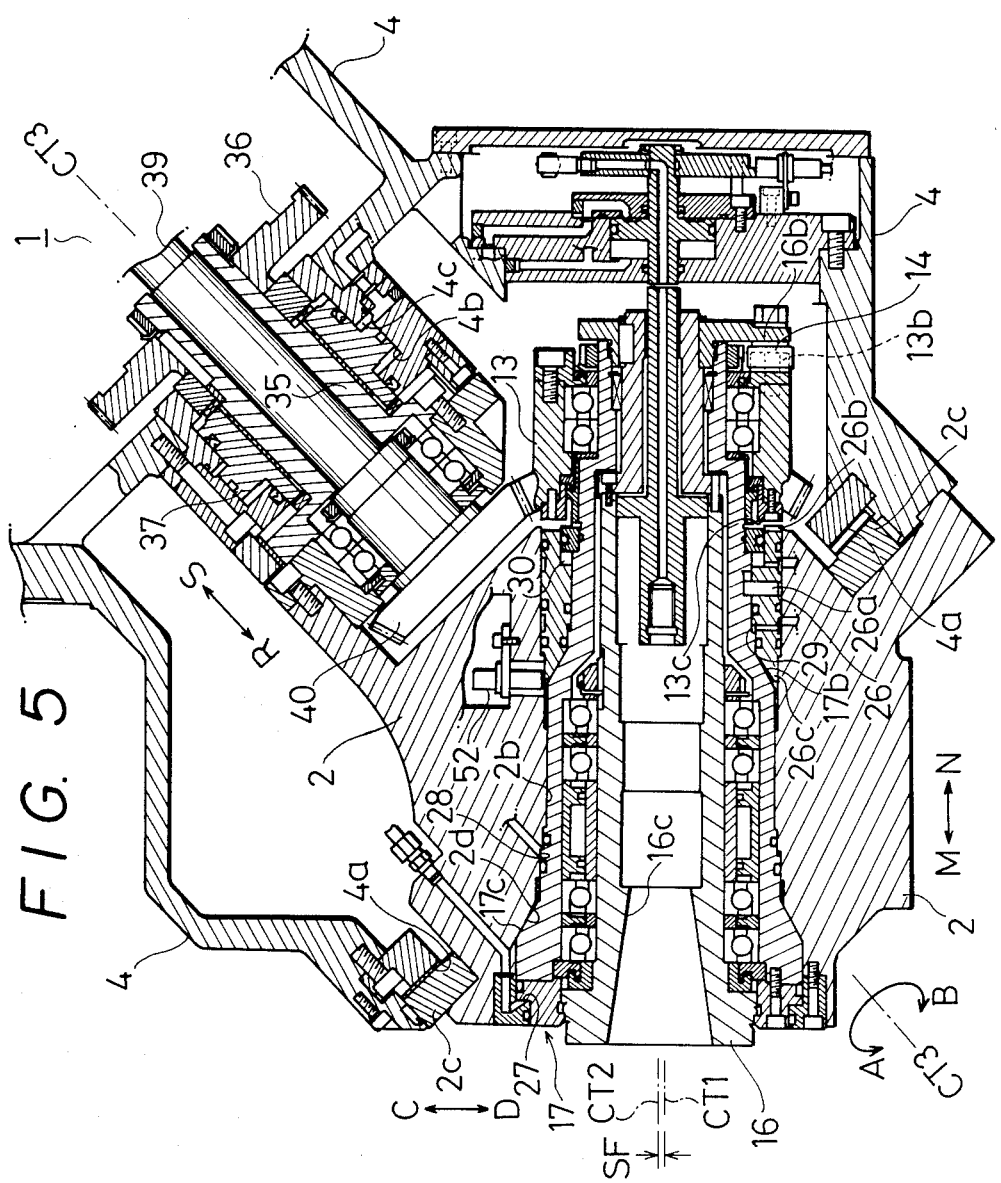
FIG. 5 is a sectional view of an eccentric tool rest according to a still other embodiment of the present invention.

An eccentric tool rest 1, as shown in FIG. 5, has a main body 4, which is provided with a turret 2 for revolving in the direction as shown by arrows A, B about a revolving center CT3 through an annular index face 4a formed on the main body 4. The turret 2 is formed with a hole 2b, in which a casing 17 is engaged in such a manner as to be rotatable and movable by a predetermined stroke in the axial direction as shown by arrows M, N. Between the casing 17 and the hole 2b, a cylindrical one-position coupler 26 is engaged in such a manner as to be slidable only in the direction as shown by the arrows M, N. Between the one-position coupler 26 and the casing 17, a pin 26a is interposed. The one-position coupler 26 and the casing 17 can be integrally rotated by the pin 26a about the axis CT1. The right-hand edge side portion (FIG. 5) of the one-position coupler 26 is formed only at one place with an engagement claw 26b. Furthermore, among the hole 2b, the casing 17 and the one-position coupler 26, oil chambers 27, 28, 29, 30 are defined.

The right-hand edge portion (FIG. 5) on the outer peripheral portion of the casing 17 is provided with a bevel gear 13 rotatably supported thereon through a bearing. The right-hand side portion (FIG. 5) of the bevel gear 13, as shown in FIG. 4, is formed with a groove 13b. By the way, the rotary tool spindle 16 is rotatably supported on the casing 17 through a bearing. The rotary tool spindle 16 is formed with a tool holding portion 16c adapted to hold at its left-hand edge portion (FIG. 5) with a rotary tool 15. The rotary tool spindle 16 is supported in such a manner as that the rotary center CT2 of the spindle 16 is shifted by an amount SF with respect to the rotary center CT1 of the casing 17. A guide roller 14 is rotatably supported on the right-hand edge portion (FIG. 5) of the rotary tool spindle 16 through an arm 16b. The guide roller 14, as shown in FIG. 4, is engaged in the groove 13b for movement therein in the direction as shown by arrows K, L..

Figure 6:
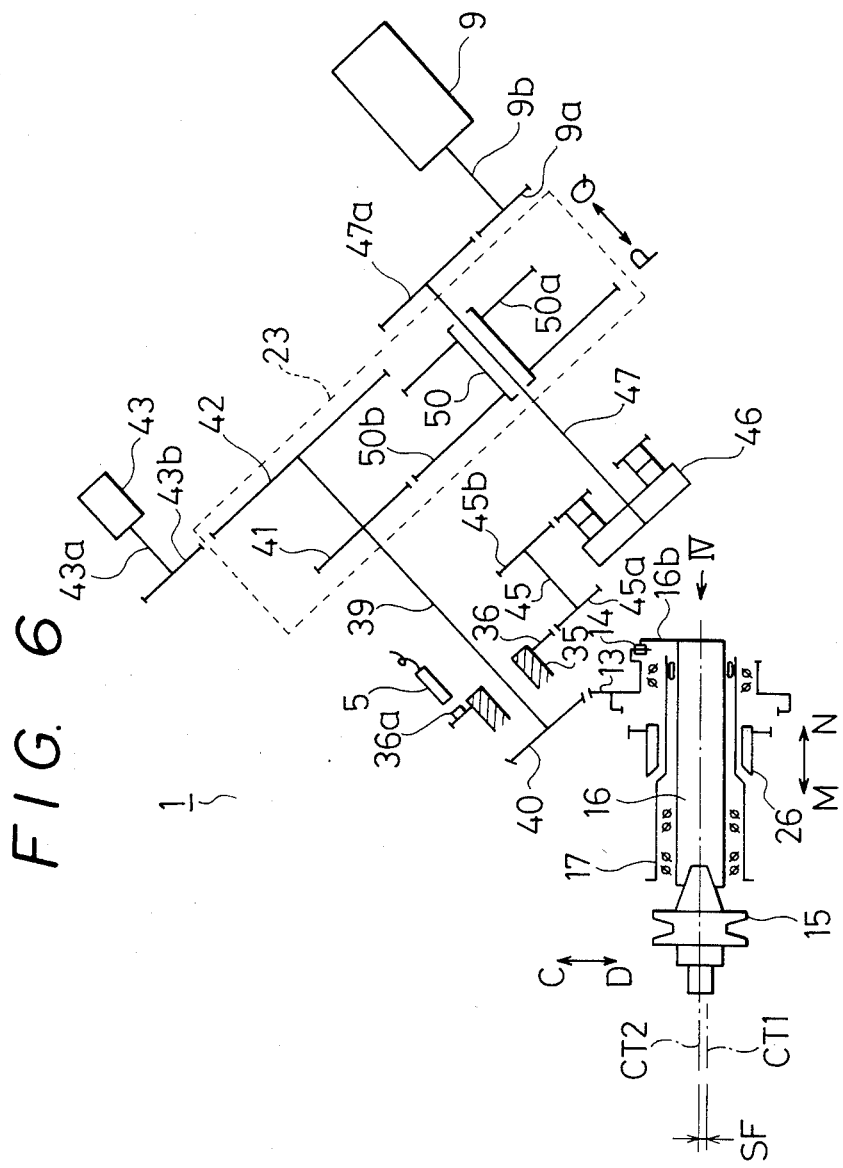
FIG. 6 is a schematic view showing a drive system of the eccentric tool rest of FIG. 5.

On the other hand, a hollow shaft 35, as is shown in FIG. 5, is rotatably supported in the main body 4. The hollow shaft 35 is connected with a gear 36 and a turret 2. The hollow shaft 35 is provided with a piston 37 for relative rotation with the hollow shaft 35. Furthermore, the piston 37 is slidably engaged in a cylinder 4b formed on the main body 4 for sliding in the direction as shown by arrows R, S. Rotatably supported on the hollow shaft 35 through a bearing, etc. is a shaft 39, on one end of which a bevel gear 40 meshed with a bevel gear 13 is provided. The other end of the shaft 39, as is shown in FIG. 6, is provided with gears 41, 42. The gear 42 is meshed with a gear 43b provided on an input shaft 43a of a position coder 43.

On the other hand, the gear 36, as is shown in FIG. 6, is meshed with a gear 45a secured to one end of a shaft 45. The other end of the shaft 45 is formed with a gear 45b. The gear 45b is connected to a shaft 47 through an electromagnetic clutch 46. The other end of the shaft 47 is provided with a gear 47a. The gear 47a is meshed with a gear 9a secured to an output shaft 9b of a drive motor 9. Furthermore, the shaft 47 is slidably engaged with a sleeve 50 constituting a change speed mechanism 23 for sliding only in the direction as shown by arrows P, Q. The sleeve 50 is provided with gears 50a, 50b which are selectively meshed with the gears 42, 41 respectively, thereby to properly change the speed of power transmitted from the drive motor 9 through gears 9a, 47a, shaft 47, sleeve 50. The gear 36 is formed with a dog 36a adapted to index the turret. At a location opposite to the dog 36a, a proximity sensor 5 is provided.

With the above-described construction of the eccentric tool rest 1, when the turret 2 is to be revolved with respect to the main body 4 for machining, a pressure oil is supplied to the oil chamber 4c of the cylinder 4b to move the piston 37 in the direction as shown by the arrow R. Then, the hollow shaft 35 and the shaft 39 within the hollow shaft 35 are also moved for a predetermined distance in the direction as shown by the arrow R. As a result, the entire turret 2 is moved in the direction as shown by the arrow R. Then, the periphery 2c of the turret 2 is disengaged from the index face 4a of the main body 4 to allow the turret 2 to freely rotate about the hollow shaft 35, i.e., the revolving center CT3. At this time, the electromagnetic clutch 46 is actuated to connect the shaft 47 to the gear 45b and the drive motor 9 is rotated for predetermined angles in that state. Then, the torque of the drive motor 9 is transmitted to the hollow shaft 35 through gears 9a, 47a, shaft 47, electromagnetic clutch 46, gear 45b, shaft 45, and gears 45a, 36 to rotate the hollow shaft 35 for predetermined angles. When the hollow shaft 35 is rotated, the turret 2, which is connected to the hollow shaft 35, is also rotated for predetermined angles either in the arrow A direction or the arrow B direction about the center CT3. As a result, the rotary tool spindle 16, etc. on the turret 2 are rotated for predetermined angles with respect to the main body 4 and brought to predetermined positions. Since the turret 2 is rotated about the CT3 which is the center of the shaft 39 provided with the bevel gear 40, the meshing state between the gear 40 and the bevel gear 13 of the casing 17 is maintained in good conditions during and after the revolving of the turret 2.

In this way, when the turret 2 was indexed and brought to the predetermined position, the electromagnetic clutch 46 is stopped actuating to disconnecting the shaft 47 from the shaft 45 and moving the piston 37 in the direction as shown by the arrow S, thereby to move the turret 2 in the arrow S direction. Then, the periphery 2c of the turret 2 is engaged with the index face 4a of the main body 4, thereby to secure the turret 2 to the main body 4.

When a machining is to be performed using a rotary tool in the foregoing state, the rotary tool 15 to be used in machining is mounted on the tool holding portion 16c of the rotary tool spindle 16. Then, depending on the kinds of machining using the tool, the operation required for moving the center CT2 of the rotary tool spindle 16 for a predetermined distance in the Y-axis direction, which is the direction shown by the arrows C, D of FIG. 6, from the normally machining position which is in alignment with the revolving center CT1 (in the Y-axis direction) of the casing 17 is preformed (As a matter of course, the following operation for shifting is not necessary for a machining which is not required the shifting operation in the Y-axis direction. Such machining is started at the normal machining position (tool changing position)).

When the Y-axis shifting operation is to be performed, a pressure oil is first supplied to the oil chamber 29 to move the one-position coupler 26 in the N direction with respect to the hole 2b. Then, the abut-engagement relation between the engagement portion 26c formed in a wedge shape at the left-hand edge portion (FIG. 5) of the one-position coupler 26 and the tapered portion 17b of the casing 17 is canceled and, at the same time, the engagement claw 26b at the right-hand edge portion of the one-position coupler 26 comes into abutment against the left-hand side of the bevel gear 13. Next, the pressure oil is supplied to the oil chamber 28 to move the casing 17 in the M direction with respect to the hole 2b. Then, the abut-relation between the tapered portion 2d of the hole 2 and the tapered portion 17c of the casing 17 is canceled, and the casing 17 is brought to be freely rotatable about the revolving center CT1 with respect to the turret 2.

In the foregoing state, when the drive motor 9 is rotated at a low speed, the torque of the drive motor 9 is transmitted to the shaft 39 through gears 9a, 47a, shaft 47, sleeve 50, and gears 50a, 42 or 50b, 41, and the gear 13 is caused to be rotated in a predetermined direction with respect to the casing 17 through the bevel gear 40. During the rotation of the bevel gear 13 in the predetermined direction, the engagement groove (not shown) formed at only one place on the side portion 13c (FIG. 5) of the bevel gear 13 comes into engagement with the engagement claw 26 of the one-position coupler 26. Due to the foregoing engagement, the one-position coupler 26 is further moved for an amount corresponding to the engagement depth of the engagement groove and the engagement claw 26b in the arrow N direction within the hole 2b. Since the one-position coupler 26 is always energized in the direction as shown by the arrow N by means of the pressure oil supplied to the oil chamber 29, the engaging action pressure the engagement claw 26b and the bevel gear 13 is always taken place while the bevel gear 13 is being rotated for 360°.

In this way, when the bevel gear 13 was engaged with the one-position coupler 26, and the one-position coupler 26 was further moved in the N direction, the proximity sensor 52, which is placed adjacent and opposite to the engagement portion 26c of the one-position coupler 26 on the turret 2 detects the movement of the one-position coupler 26 in the N direction and outputs a predetermined signal. Upon receipt of the signal, the position coder 43 starts calculation of the rotary angle of the casing 17.

More specifically, when the drive motor 9 is rotated at a low speed in the foregoing state, the torque of the motor 9 is transmitted to the shaft 39 through gears 9a, 47a, shaft 47, sleeve 50, and gears 50a, 42 or 50b, 41, and the bevel gear 13 is caused to be rotated through the bevel gear 40. When the bevel gear 13 is rotated, the torque of the bevel gear 13 is transmitted to the casing 17 through the one-position coupler 26, and the casing 17 is caused to be rotated about the center CT1 with respect to the hole 2b, i.e. the turret 2. When the casing 17 is rotated together with the bevel gear 13, as is shown in FIG. 4, the rotary tool spindle 16 supported on the casing 17 is also rotated. However, since the revolving center CT2 of the rotary tool spindle 16 is shifted for a shifting amount SF with respect to the revolving center CT1, the revolving center CT2 of the rotary tool spindle 16, while the casing is being rotated for 360°, is moved for 2SF in the Y-axis direction, which is the direction as shown by the arrows C, D, with respect to the revolving center CT1 of the casing 17 in such a manner as to draw a circle having a diameter of 2SF as shown by the dotted line in the figure.

More specifically, when the casing 17 and the rotary tool spindle 16 is rotated for 90° in the direction as shown by the arrow E of FIG. 4 with respect to the normal machining (tool changing) position (corresponding to the position P1 of FIG. 4) in which the shifting action of the Y-axis is not accompanied, and the engaging position of the groove 13b and the guide roller 14 is moved from the normal machining position P1 to the position P2, the revolving center CT2 is moved for the distance SF in the direction as shown by the arrow C. When the casing 17 and the rotary tool spindle 16 are rotated for 90° in the direction as shown by the arrow F of FIG. 4 with respect to the normal machining position, and the engaging position of the groove 13b and the guide roller 14 is moved from the normal machining position P1 to the position P3, the revolving center CT2 is moved for the distance SF in the direction as shown by the arrow D. Accordingly, by rotating the casing 17 (bevel gear 13) and the rotary tool spindle 16 within the range of ±90° either in the direction as shown by the arrow E or the direction shown by the arrow F, the revolving center CT2 is moved within the range of the distance ±SF in the directions shown by the arrows C, D. Due to the foregoing, the rotary tool 15 can be also moved within the range of the distance ±SF in the Y-axis direction. Of course, the rotary tool 15 can be correctly positioned by rotating the casing 17 and the rotary tool spindle 16 within the range of 360°.

Since the moving amount of the rotary tool spindle 16 in the Y-axis direction can be obtained by detecting the rotary angles of the casing 17 using the position coder 43 through the shaft 39, etc., the rotary tool spindle 16 can be moved to any desired position by appropriately controlling the rotary angle of the drive motor 9 while watching the output of the position coder 43.

In this way, when the rotary tool 15 was shifted for a predetermined amount in the Y-axis direction, a pressure oil is supplied to the oil chamber 27 to move the casing 17 in the direction as shown by the arrow N and the tapered portions 17c and 2d are brought into abut-engagement under a predetermined contact pressure and, at the same time, a pressure oil is supplied to the oil chamber 30 to move the one-position coupler 26 in the direction as shown by the arrow M. Then, the engagement claw 26b of the one-position coupler 26 is disengaged from the bevel gear 13 and, at the same time, the engagement portion 26c enters into between the tapered portion 17b of the casing 17 and the hole 2b in the wedge shape, thereby to prevent the casing 17 from being rotated with respect to the hole 2b. Due to the foregoing, the casing 17 is surely held stationary at two places of the tapered portions 17b, 17c with respect to the hole 2b.

In the foregoing state, when the drive motor 9 is rotated, the torque of the drive motor 9 is transmitted to the shaft 39 through gears 9a, 47a, shaft 47, sleeve 50, and gears 50a, 42 or 50b, 41 and rotates the bevel gear 13 through the bevel gear 40. When the bevel gear 13 is rotated, the groove 13b of the bevel gear 13 is also rotated, and the rotary tool spindle 16 is also rotated through the guide roller 14 engaged in the groove 13b and the arm 14b. Since the revolving centers CT2, CT1 of the rotary tool spindle 16 and the casing 17, as already mentioned, is shifted for a predetermined distance (including the zero shifting amount), the shifted rotary tool spindle 16 is rotated while rolling the guide roller 14 in the directions as shown by the arrows K, L of FIG. 4 within the groove 13b of the gear 13 which is rotated about the revolving center CT1.

In this way, the rotary tool spindle 16 is rotated within the casing 17 which is held stationary. Accordingly, the rotary tool 15 mounted on the rotary tool spindle 16 is also rotated, thereby to perform a predetermined machining. At this time, since the electromagnetic clutch 46 is not actuated, the connection between the shaft 47 and the gear 45b is cut. Accordingly, even if the shaft 47 is rotated by the drive motor 9, it never occurs that the shaft 45 is rotated to rotate the turret 2. Thus, the rotary tool 15 can performed a machining smoothly.

Although the present invention has been described with reference to the preferred embodiments, the embodiments described herein are for illustrative purposes only and not in limitation thereof. Also, the scope of the present invention is defined in the appended claims and will not be binded by the description of the embodiments. Accordingly, it will be understood that all changes and modifications which belong to the appended claims fall within the true spirit and scope of the present invention.

What is claimed is:

1. An eccentric tool rest comprising:
    a casing;
    tool supporting means, for supporting said casing, formed with a hole having a first tapered portion, said casing being rotatably and stoppably held in said hole; said casing having formed on its outer periphery, a second tapered portion which engages said hole having a first tapered portion;
    casing drive means connected to said casing adapted for moving said casing in the axial direction of said casing and for holding said casing stationary with respect to said tool supporting means by bringing said first and second tapered portions into abutengagement with each other;
    a rotary tool spindle rotatably mounted on said casing so as to have an eccentric rotary center with respect to the rotary center of said casing;
    power transmission means, for driving said rotary tool spindle, rotatably supported on an outer peripheral portion of said casing and adapted for rotation with respect to said casing;
    eccentric engagement means for engaging said power transmission means and said rotary tool spindle; and
    rotation drive means connected to said casing and adapted to rotate said casing.

2. An eccentric tool rest as defined in claim 1, wherein said power transmission means comprises a first gear, and said eccentric engagement means comprises an inner second gear formed on said gear and a third gear formed on said rotary tool spindle which meshes with said second gear.

3. An eccentric tool rest as defined in claim 1, wherein said power transmission means comprises a gear, and said eccentric engagement means comprises a slide-engagement means, interposed between said gear and said rotary tool spindle, for positively engaging said gear and said rotary tool spindle.

4. A eccentric tool rest comprising:
    a casing;
    tool supporting means for supporting said casing, said casing being rotatably and stoppably attached to said tool support means;
    a rotary tool spindle rotatably supported on said casing so as to have an eccentric rotary center with respect to a rotary center of said casing;
    power transmission means, for driving said rotary tool spindle, rotatably supported on an outer peripheral portion of said casing for rotation with respect to said casing;
    eccentric engagement means for engaging said power transmission means with said rotary tool spindle; and
    clutch means, interposed between said casing and said power transmission means, adapted to cut and connect the transmission of torque from said power transmission means to said casing.

5. An eccentric tool rest as defined in claim 4, wherein said power transmission means comprises a first gear, and said eccentric engagement means comprises an inner second gear formed on said gear and a third gear provided on said rotary tool spindle which meshes with said second gear.

6. An eccentric tool rest as defined in claim 4, wherein said power transmission means comprises a gear, and said eccentric engagement means comprises a slide-engagement means, interposed between said gear and said rotary tool splindle, for positively engaging said gear and said rotary tool spindle.

7. An eccentric tool rest as defined in claim 1, wherein said power transmission means comprises a first gear, and said rotation drive means comprises a second gear and clutch which engages said second gear.

8. An eccentric tool rest comprising:
a casing;
tool supporting means for supporting said casing so that said casing is rotatably and stoppably attached to said tool support means;
a rotary tool spindle rotatably supported on said casing so as to have an eccentric rotary center with respect to a rotary center of said casing;
a first gear, for driving said rotary tool spindle, rotatably supported on said casing;
an inner gear formed on said first gear; and
a second gear provided on said rotary tool spindle which meshes with said inner gear.

9. An eccentric tool rest comprising:
a casing;
tool supporting means for supporting said casing so that said casing is rotatably and stoppably attached to said tool support means;
a rotary tool spindle rotatably supported on said casing so as to have an eccentric rotary center with respect to a rotary center of said casing;
a first gear, for driving said rotary tool spindle, rotatably supported on said casing;
an engaging means for transmitting torque from said first gear formed on said first gear in a direction of the diameter of said first gear; and
a sliding means provided on said rotary tool spindle for transmitting the torque of said first gear to said rotary tool spindle by meshing with said engaging means and being slidable along said tool spindle.

* * * * *